US008782724B2

(12) United States Patent
Wang

(10) Patent No.: US 8,782,724 B2
(45) Date of Patent: Jul. 15, 2014

(54) USER EDITABLE METADATA FOR INTERACTIVE TELEVISION PROGRAMS

(75) Inventor: Changqing Wang, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 834 days.

(21) Appl. No.: 12/638,680

(22) Filed: Dec. 15, 2009

(65) Prior Publication Data

US 2011/0145880 A1    Jun. 16, 2011

(51) Int. Cl.
*H04N 7/173* (2011.01)

(52) U.S. Cl.
USPC ............... 725/109; 725/47; 725/51; 725/110; 725/112; 709/248

(58) Field of Classification Search
USPC .......................... 725/38, 47, 40, 45
See application file for complete search history.

(56) References Cited

U.S. PATENT DOCUMENTS

| 2003/0182663 | A1* | 9/2003 | Gudorf et al. | 725/110 |
| 2005/0086690 | A1* | 4/2005 | Gilfix et al. | 725/42 |
| 2005/0262542 | A1* | 11/2005 | DeWeese et al. | 725/106 |
| 2009/0007200 | A1* | 1/2009 | Amento et al. | 725/100 |
| 2009/0271524 | A1* | 10/2009 | Davi et al. | 709/231 |
| 2010/0218228 | A1* | 8/2010 | Walter | 725/105 |
| 2011/0107369 | A1* | 5/2011 | O'Brien et al. | 725/38 |

* cited by examiner

*Primary Examiner* — Jun Fei Zhong

(57) ABSTRACT

Television programming may be annotated with metadata and the metadata may be shared among subscribers. A set-top box may receive, from a server, metadata relating to a television program, the metadata having been created by users of other set-top boxes and at least some elements of the metadata including information describing portions of the television program to which the metadata is relevant. The set-top box may present the metadata during portions of the television program at which the metadata is relevant.

20 Claims, 11 Drawing Sheets

| PROGRAM ID 510 | METADATA TYPE 520 | METADATA EXTENT 530 | CREATOR ID 540 | TIME-STAMP 550 | CONTENT 560 |
|---|---|---|---|---|---|
| HAPPY DAYS, EPISODE 2 | USER COMMENT | SCENE 5 | BILL | 1/1/2010 8AM | In this scene... |
| FOOTBALL, PSU V FLU, OCT 5, 2009 | ABSTRACT | ALL | OWNER | 10/10/2009 6AM | A classic matchup of ... |
| THE CITY | GRAPHIC | 0-10 MINUTES | JAY | 10/01/2009 10:10PM | <circle> |
| ... | | | | | |
| ID1234 | REVIEW | ALL | BILL | 1/1/2010 9AM | Five+ stars ... |

USER EDITABLE METADATA FOR INTERACTIVE TELEVISION PROGRAMS

BACKGROUND INFORMATION

Television service providers may provide video streams that are delivered to subscribers over a number of possible transmission mediums, such as fiber optic delivery, coaxial delivery, or over-the-air delivery. At the subscriber end of the television service, a client device may convert the television signal into a form that is displayable on a television set. The client device may be, for example, a set-top box (STB) through which the user may control a channel that is being viewed.

In addition to converting television signals into video content that is viewable on a television, STBs may perform other functions, such as recording television programming or providing a television guide to the user. The television guide may include information describing the various content items offered by the television service providers. Typically, however, the information in the programming guide about the content items may be limited to a brief description of the program.

BRIEF DESCRIPTION OF THE DRAWINGS

FIG. 5 is a portion of an exemplary computer-readable medium that may be associated with a resource information management component of the server shown in FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit consumers and creators of content, such as video delivered as television programming, to annotate the content. The consumers may browse the annotations while viewing the content. The annotated television programs may enable two-way information sharing among viewers of the television programs.

Figure 1:
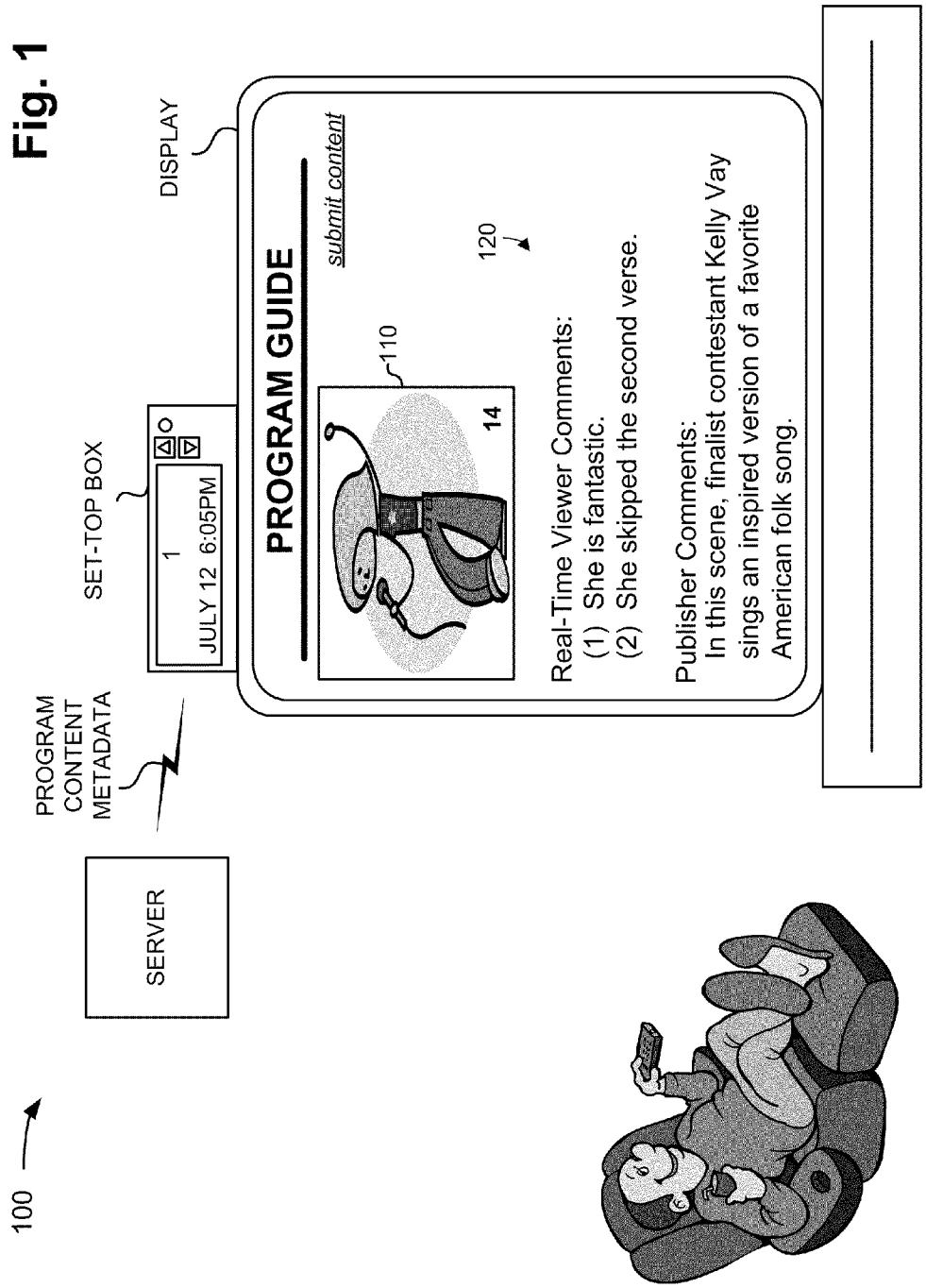
FIG. 1 is an exemplary diagram presenting an overview of concepts described herein.

FIG. 1 is an exemplary diagram presenting an overview of concepts described herein. As illustrated, a set-top box may be associated with a display and a server. The server may receive information from and send information to the set-top box relating to a television program to which the set-top box is currently tuned. The server may collect this information and information from other set-top boxes to obtain, in real time, metadata relating to the current television program. The metadata may include information, such as comments from other viewers or comments from the creator or publisher of the content. The metadata may be associated with structural elements of the television program. For example, different items of metadata may be most relevant to particular scenes of the program, particular objects or characters within the program, or to other structural elements of the program.

In the example shown in FIG. 1, a television program 110 that is being watched by the viewer may be presented on the display along with metadata 120 that is relevant to television program 110. The user may, for example, request that metadata 120 be displayed that corresponds to the current frame or sequence of television program 110. Assume that for television program 110, metadata 120 includes comments from other viewers and from the creator/publisher of television program 110. These comments may be displayed to the user. In some implementations, the user may also choose to submit comments relating to television program 110, by, for example, selecting a "submit comment" link.

The terms "program" and/or "television program," as used herein, is to be broadly construed to include any type of video content that can be provided from a video display device, such as a set-top box. For example, a program may correspond to live television programming (meaning that the programming is currently airing on a television channel), video-on-demand programming, pay-per-view programming, user generated content, programming recorded via a digital video recorder, and/or other types of video content.

As used herein, the term "video client" or "set-top box" may refer to any media processing device that may receive multimedia content over a network, and may provide such multimedia content to an attached video display device (such as a television). Also, as used herein, the terms "viewer," "user," "subscriber," "consumer," and "customer" may refer interchangeably to a person who interacts with, orders, views, or listens to television programming.

Figure 2:
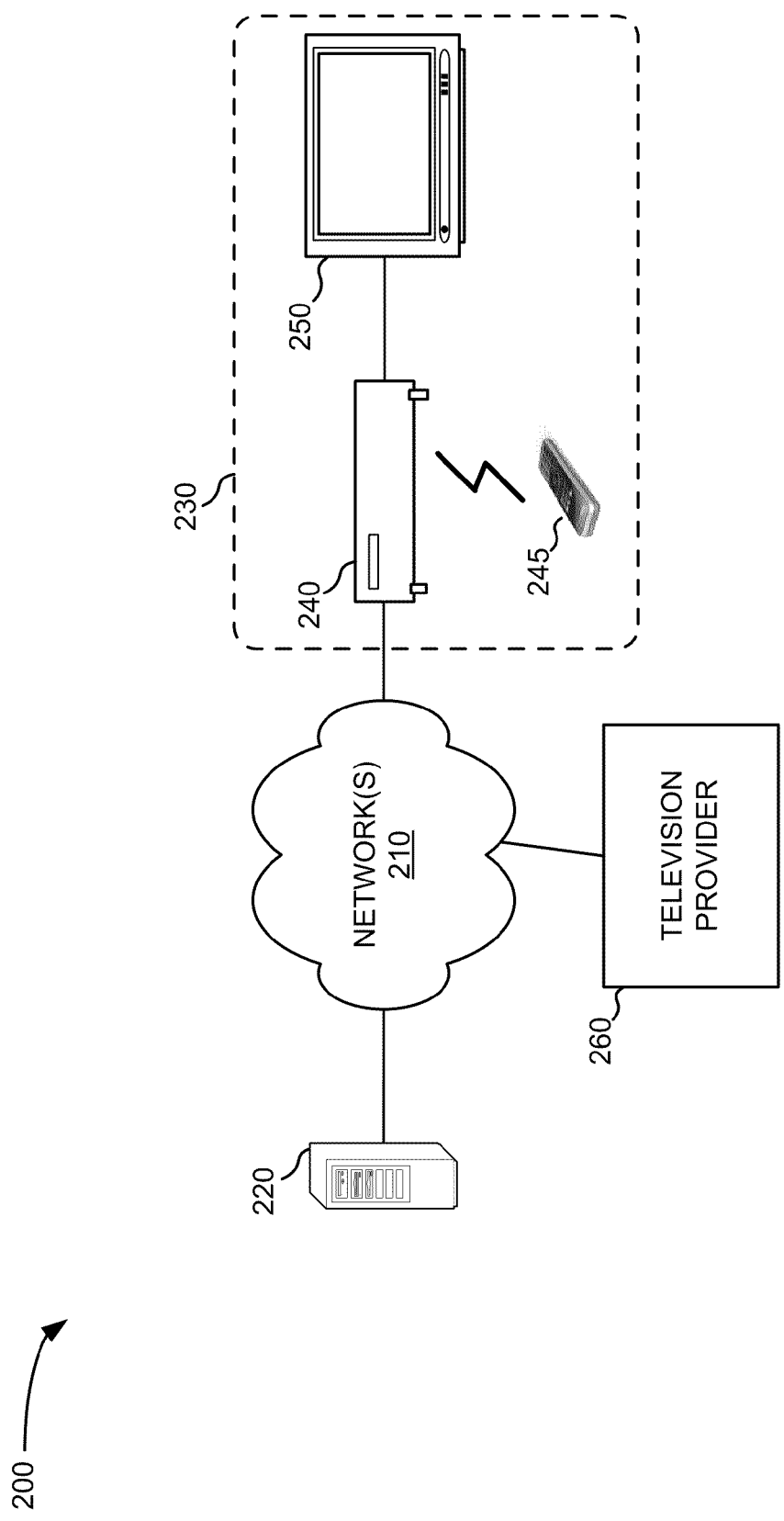
FIG. 2 is a diagram of an exemplary system in which systems and/or methods described herein may be implemented.

FIG. 2 is a diagram of an exemplary system 200 in which systems and/or methods described herein may be implemented. As illustrated, system 200 may include network(s) 210, which may connect a server 220 and a television provider 260 to a subscriber premise 230. Subscriber premise 230 may include devices used by a television subscriber to receive television service. As shown, subscriber premise 230 may include a set-top box 240, a remote control 245, and a video display device 250.

Network 210 may include one or more networks of any type, including a television network (such as a cable television network or a fiber optic television network), a Public Land Mobile Network (PLMN), a Public Switched Telephone Network (PSTN), a local area network (LAN), a metropolitan area network (MAN), a wide area network (WAN), a private network, the Internet, an intranet, and/or another type of network.

Server 220 may include one or more devices that communicate with subscriber premises 230. Server 220 may accumulate metadata relating to television programs from various subscribers, content creators, or other entities. Server 220 may additionally transmit, when requested by subscribers, the metadata to the subscribers. Through the interaction of set-top boxes 240 with server 220, an interactive two-way communication platform for consuming television programming may be created. Server 220 may connect to network 210 via a wired and/or wireless connection.

Television provider 260 may include one or more devices for delivering television programs to subscriber premises 230. Television provider 260 may deliver television programs via wireless and/or wired connections. For example, television provider 260 may provide television programming to subscriber premises 230 over fiber optic cable, coaxial cable, or over-the-air broadcast.

Although server 220 and television provider 260 are shown as separate entities in FIG. 2, in some implementations, the functionality of server 220 and television provider 260 may be performed by a single entity in which the devices used to implement server 220 and television provider 260 may overlap.

As mentioned, subscriber premise 230 may include set-top box 240, remote control 245, and video display device 250. Set-top box 240 may include a device for selecting and/or obtaining television programs that may be shown or played on video display device 250. Although called a "set-top box" herein, device 240 may more generally include any device used to obtain and present television programs, such as stand-alone set-top box, a cable card, a digital video recorder, or a device integrated within display device 250. Set-top box 240 may receive a television signal from network 210, may convert the signal to a form usable by video display device 250, and may transmit the signal to video display device 250 for display. Set-top box 240 may further allow a user to select the programming provided to video display device 250 based on a signal (e.g., a channel up or channel down signal) from remote control 245. Set-top box 240 may also be capable of sending data to server 220.

In one implementation, set-top box 240 may provide an interface through which users may view metadata for television programs. The metadata may be inserted by the entity that generated that television program (e.g., the content creator) or by other television subscribers. The interface provided by set-top box 240 may also allow users to enter metadata for a television program. The entered metadata may be transmitted to server 220 and disseminated to other television subscribers, who may view the metadata.

Remote control 245 may include one or more devices through which a user can interact with set-top box 240. For instance, remote control 245 may include a handheld device through which a user may press buttons to cause information to be transmitted to set-top box 240. Other user interface devices may also be used to interact with set-top box 240, such as a keyboard or pointing device (e.g., a mouse). The interface devices may interact wirelessly with set-top box 240 to provide a comfortable environment through which the user may view and interact with television programming.

Video display device 250 may include a digital or analog display via which a user may view television programs. Video display device 250 may refer to any device that can receive and display multimedia content delivered over network 210 for perception by users. Video display device 250 may include technologies, such as cathode ray tube (CRT) displays, liquid crystal displays (LCDs), light-emitting diode (LED) displays, plasma displays, etc.

Figure 3:
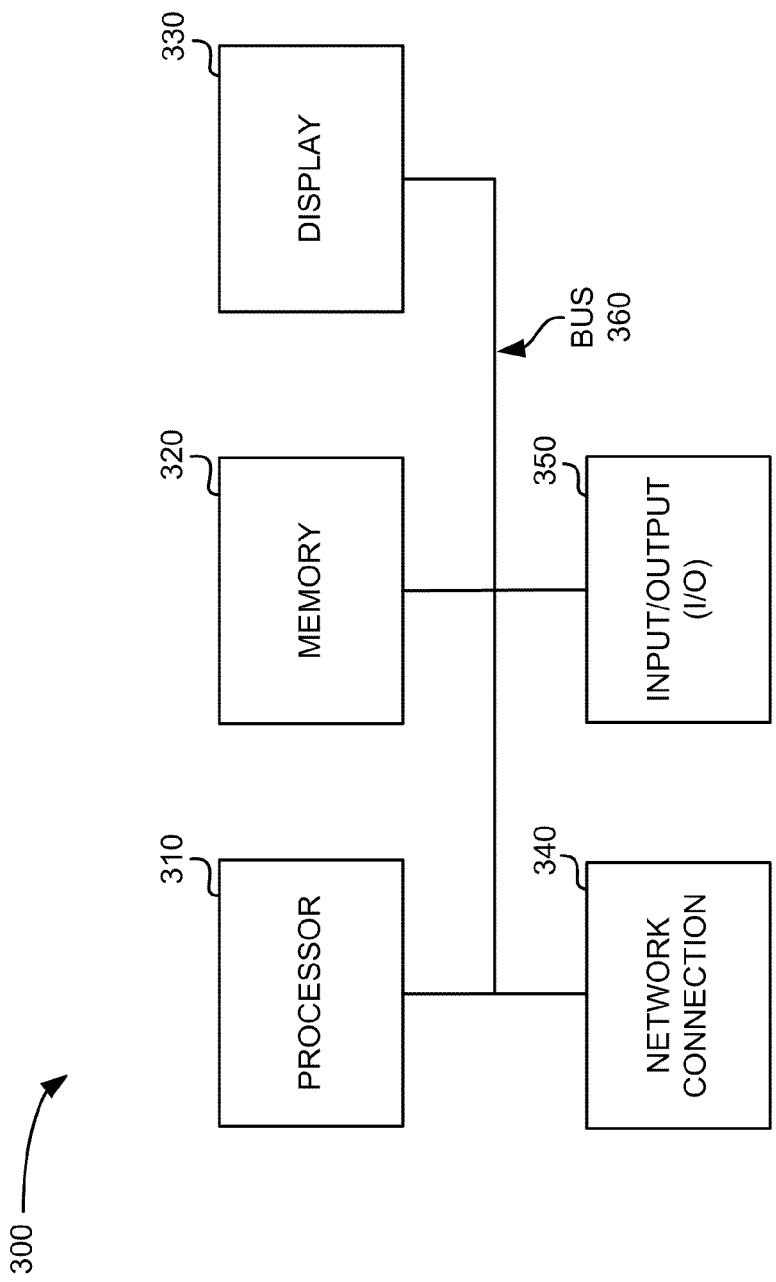
FIG. 3 is diagram illustrating exemplary components of one of the devices shown in FIG. 2.

FIG. 3 is diagram illustrating exemplary components of a device 300 that may correspond to server 220, set-top box 240, or television provider 260. As shown, device 300 may include a processor 310, a memory 320, a display 330, a network connection 340, an input/output (I/O) component 350, and a bus 360.

Processor 310 may include a processor, microprocessor, or another type of processing logic that interprets and executes instructions. When device 300 corresponds to server 220, processor 310 may execute instructions to facilitate the exchange of metadata relating to television programs with set-top box 240. When device 300 corresponds to set-top box 240, processor 310 may execute instructions to communicate with server 220, present television programs on video display device 250, and receive commands from a subscriber and respond to the commands.

Memory 320 may include a dynamic or static storage device that may store information and instructions for execution by processor 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 330 may include any component capable of providing visual information. For example, in one implementation, display 330 may be a light emitting diode (LED) or a liquid crystal display (LCD). In another implementation, display 330 may use another display technology. Display 330 may display, for example, text (such as a time, a date or a channel selection), image, and/or video information. Display 330 may be an optional component.

Network connection 340 may include any transceiver-like mechanism that enables device 300 to communicate with other devices and/or systems. For example, network connection 340 may include an Ethernet interface, an optical interface, a coaxial interface, a radio interface, or the like. Network connection 340 may allow for wired and/or wireless communication. Network connection 340 may be configured to connect device 300 to a packet-based IP network.

Input/output devices 350 may generally include user input devices such as external buttons, and output devices, such as LED indicators. With input/output devices 350, a user may generally interact with device 300. In some implementations, input/output devices 350 may be implemented via a remote control. Bus 360 may provide an interface through which components of device 300 can communicate with one another.

Although FIG. 3 shows exemplary components of device 300, in other embodiments, device 300 may include fewer, different, differently arranged, or additional components than depicted in FIG. 3. Additionally, or alternatively, one or more components of device 300 may perform the tasks described as being performed by one or more other components of device 300.

Figure 4:
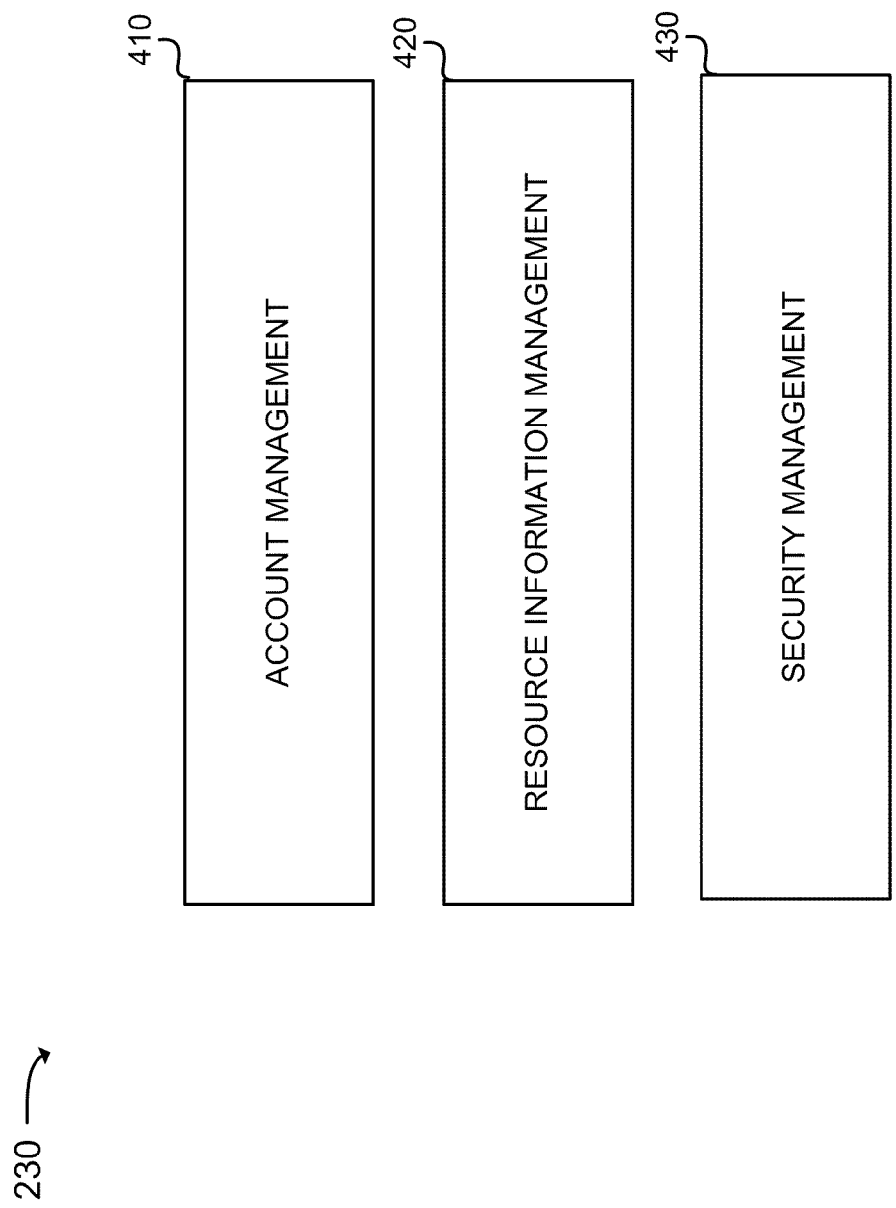
FIG. 4 is a diagram of exemplary functional components of a server shown in FIG. 2.

FIG. 4 is a diagram of exemplary functional components of server 220. As illustrated, server 220 may include an account management component 410, a resource information management component 420, and a security management component 430.

Account management component 410 may include one or more components that manage account information for subscribers. Account management component 410 may, for example, provide authentication services for subscribers. For example, a single set-top box 240 or household may be associated with multiple user accounts. Different people in the household, when submitting comments for television programs, may use different accounts. Account management component 410 may also store customization information for each account. For example, information relating to how metadata is to be presented by set-top box 420 may also be maintained by account management component 410. This information may include, for example, a number of comments to display or whether to block comments from certain other accounts.

Resource information management component 420 may include one or more components to manage the metadata for the television programs. Resource information management component 420 may generally receive and store metadata for television programs. The metadata may be received from subscribers, publisher of the television program, or from other sources, such as information relating to the program that is gathered from a database or the Internet. Resource information management component 420 may additionally deliver the stored metadata to set-top boxes 240 for presentation of the metadata to the subscribers. As previously mentioned, the metadata may be associated with structural elements of the television programs, such as a particular frame, image, or section of a television program. The metadata may be used to generally enhance the viewing experience of subscribers.

Security management component 430 may include one or more components to manage security policies relating to the metadata stored by resource information management component 420. Security management component 430 may store information describing which accounts have access to the various items of metadata. Certain metadata items, such as user comments, may be tagged as "private", which may indicate that the metadata items may only be seen by accounts that have been approved by the creator of the metadata (e.g., a user may desire that her comments about a particular program are only seen by users that she pre-approves on a "friends" list).

Although FIG. 4 shows exemplary functional components of server 220, in other embodiments, server 220 may include fewer, different, differently arranged, or additional functional components than depicted in FIG. 4. Additionally, or alternatively, one or more functional components of server 220 may perform the tasks described as being performed by one or more other functional components of server 220.

FIG. 5 is a portion of an exemplary portion of a computer-readable medium 500 that may be associated with resource information management component 420 of server 220. Additionally or alternatively, computer-readable medium 500 may be associated with another device, such as television provider 260. While one computer-readable medium is described below, it will be appreciated that computer-readable medium 500 may include multiple computer-readable media stored locally or in a distributed manner over multiple computing devices.

As illustrated, computer-readable medium 500 may maintain entries, each of which may correspond to a metadata entry relating to a particular television program. In FIG. 5, each entry is shown as a row in computer-readable medium 500. The metadata entries may be stored as part of a searchable database, such as a relational database. The exemplary group of entries shown for computer-readable medium 500 may include a program identification (ID) field 510, a metadata type field 520, a metadata extent field 530, a creator ID field 540, a timestamp field 550, and a content field 560.

Program ID field 510 may identify the program to which the metadata applies. In FIG. 5, entries in program ID field 510 are shown as textual labels. In other implementations, other formats could be used to store program identifiers. For example, a number or code may be assigned by the television provider (or another entity) to each different television program.

Metadata type field 520 may store an indication of the type or types of each metadata entry. In FIG. 5, metadata type field 520 is illustrated as being implemented using text labels. In other implementations, the type of each metadata entry may be specified using other formats. Examples of possible metadata types include: user submitted textual comments about the program (USER COMMENT), an abstract or other textual summary of the program (ABSTRACT), and a graphical mark applied to one or more particular frames of the program (GRAPHIC). A graphical mark may be, for example, a circle or other highlight mark that a user may place around a particular portion of a frame of a program. Other metadata types are possible, examples of which include, without limitation: reviews of the program from third-party publications (REVIEW) and information describing structural elements of the television program, such as scene demarcations and a short description of each scene.

Metadata extent field 530 may indicate the portion of the program to which the metadata entry is relevant. For instance, some metadata entries may be relevant to the entire program, such as an abstract of the program. In FIG. 5, the second entry in computer-readable medium 500 may be relevant to the entire program and is marked as "ALL." Other metadata entries may be relevant to only a particular scene, a particular timespan within the program, or a particular frame or set of frames. As shown in FIG. 5, the program "HAPPY DAYS, EPISODE 2" is marked as being relevant to "SCENE 5" and the program "THE CITY" is marked as being relevant for the first ten minutes of the program (0-10 MINUTES). Metadata extent field 530 may also include entries that visually or graphically mark the relevancy of a metadata entry. For instance, metadata extent field 530 may specify the size and location of a circle (or other shape) superimposed over one or more frames in the program. The shape may be used to identify a "hotspot" to which the metadata applies.

Creator ID field 540 may store an identification of the creator of the metadata entry. For metadata entries created by subscribers, creator ID field 540 may include the account name of the subscriber. Metadata entries created by other entities, such as the content creator or the television provider, may be indicated using other labels.

Timestamp field 550 may store a date and/or time at which the metadata entry was created. Timestamps may be used when presenting the metadata to subscribers. For example, when deciding which metadata entries to present to a subscriber, more recent "user comment" type metadata entries may be given more weight that older "user comment" type entries.

Content field 560 may include the "substantive" content for the metadata entry. For a comment, review, or other textual based metadata entry, content field 560 may store the text of the entry. For other types of metadata entries, such as an audio entry, content field 560 may describe the entry using a text file or binary file. For example, for a text file, a format such as the extensible markup language (XML) format may be used.

Although FIG. 5 shows exemplary fields of computer-readable medium 500, in other embodiments, computer-readable medium 500 may include fewer, different, differently arranged, or additional fields than those depicted in FIG. 5.

In general, all of the metadata entries for a particular program may be thought of as the entire "profile" of the program. An initial profile may be set in computer-readable medium 500 by the content creator or television provider. As an example of initial entries that may define a profile, consider the following two metadata content entries:

Scene id#: sc202
Range: <st1002, st1008>

```
Parent scene id: sc100
Description: Snow white and the 7 Dwarfs are having a party
Keyframe id: fl00239
Shot id#: st10020
Range: <t1, t1>
Parent Shot id: st1000
Description: Snow white singing in the party
Keyframe id: fl00239
```

These entries may define initial structural elements of a program. Here, the first entry may include a scene identifier, a range of frame shots over which the entry applies (e.g., shots with identifiers st1002 through st1008), an identifier of the parent scent (e.g., the previous scene or a scene that is structurally higher than the current scene), a short description of the scene, and a keyframe identifier. The keyframe identifier may be an identifier for one particular frame in the range of frames that is considered to be the "key" frame for this range. The second entry may include similar information.

Figure 6:
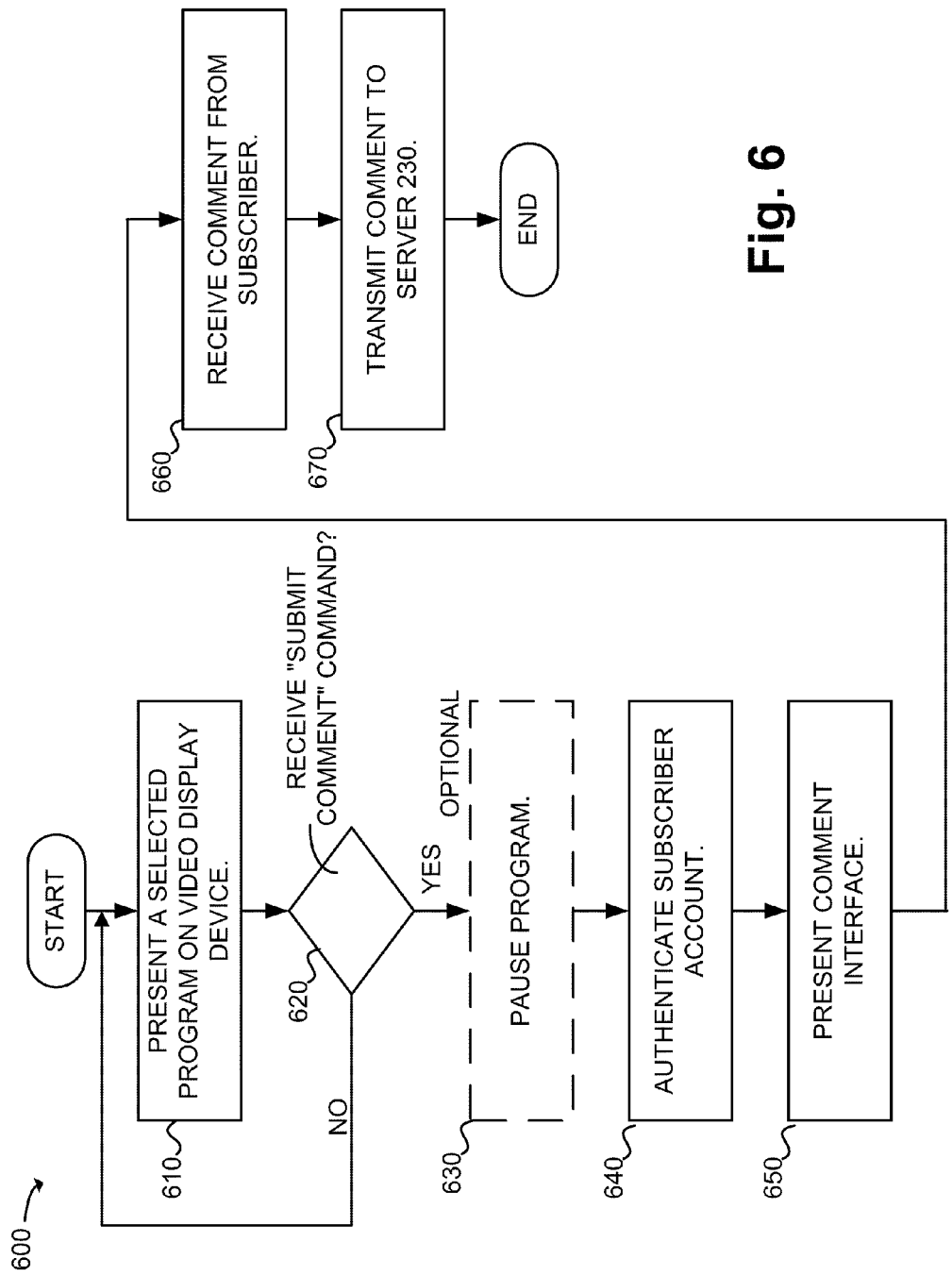
FIG. 6 is a flow chart illustrating exemplary operations for creating metadata entries for a television program.

FIG. 6 is a flow chart illustrating exemplary operations 600 for creating metadata entries for a program, such as the metadata entries shown for computer-readable medium 500. Operations 600 may be particularly applicable to a subscriber watching live or recorded (e.g., via a digital video recorder) video in which the subscriber wishes to submit a comment, or respond to another's comment, about the program. Operations 600 may be performed by set-top box 240.

Set-top box 240 may present a selected program to a subscriber (block 610). The program may be, for example, a live broadcast or a recorded television program. As previously mentioned, the subscriber may interact with set-top box 240 using a number of possible interface devices, such as remote control 245, a wireless keyboard, etc.

At some point, the subscriber may wish to submit a comment about the program currently being viewed. The subscriber may indicate their desire to leave a comment by, for example, sending a "submit comment" command to set-top box 240. The submit comment command may be initiated by the user selecting a particular button or series of buttons (such as by navigating an on-screen guide) on remote control 245.

In response to the detection of the submit comment command (block 620—YES), set-top box 240 may pause the current program (or fetch the current frame as a snapshot to be commented upon) (block 630). Whether set-top box 240 pauses the current program may be an optional operation that may not be utilized in some implementations. For example, in situations where set-top box 240 does not include the technical ability to pause the currently playing program or where the subscriber has chosen an option to not pause the currently playing program, the program may not be paused.

Set-top box 240 may next authenticate an account under which the subscriber wishes to submit a comment (block 640). Authentication may be useful, for example, to allow the subscriber to publish his comments to a selected group of other subscribers, possibly subject to security policies and access control policies. Set-top box 240 may communicate with account management component 410 and/or security management component 430 to authenticate the subscriber's account. During the authentication process, the subscriber may, for example, select the account from which the subscriber will submit a comment and logon to the account (e.g., by entering a password). In some implementations, the account of the subscriber may be tied to a unique identifier for set-top box 240. The set-top box identifier may be used as the subscriber's account and accordingly, the subscriber may not need to explicitly logon to an account to submit a comment. In still other implementations, the subscriber may initially set-up one or more accounts and may only need to re-logon to the account when changing the active account.

Set-top box 240 may next present an interface to the subscriber through which the subscriber can enter a comment (block 650). The comment interface may be a graphical interface enabling the subscriber to perform actions relevant to submitting a comment, such as entering text or graphically marking a portion of a program. The comment interface may be displayed on video display device 250.

Figure 7:
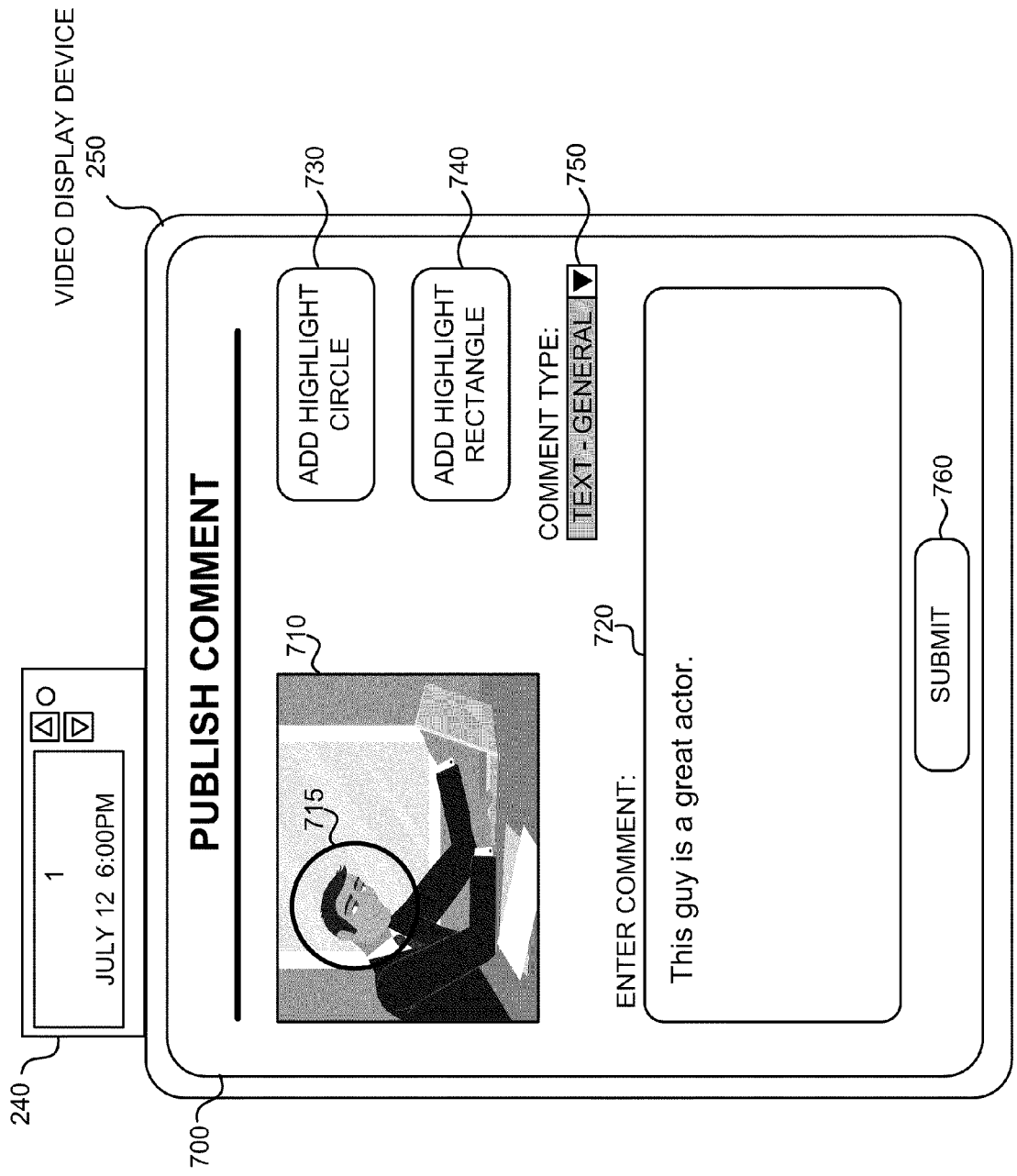
FIG. 7 is a diagram illustrating one exemplary comment interface capable of being provided by a video display device shown in FIG. 2.

FIG. 7 is a diagram illustrating one exemplary comment interface 700 displayed on video display device 250. Comment interface 700 may include an image 710, which may be taken from a program being commented upon. Image 710, for example, may be an image corresponding to the frame of the television program that was active when the user selected the submit comment command. In one implementation, image 710 could be an image corresponding to the nearest keyframe, as identified in initial metadata entries that were submitted by the content creator and that identify structural elements of the program or as identified in some other manner, such as comments previously submitted by other subscribers or an automatically determined keyframe based on previously submitted comments. Other images could alternatively be used. For example, a title frame, another frame, or a video clip of the program may be used. In some implementations, the subscriber may be given the option, such as through "back" and "forward" selection arrows, of choosing other frames near the initially displayed image 710.

Comment interface 700 may additionally include buttons, such as buttons 730 and 740, through which the user can graphically annotate or highlight sections of image 710. For example, "add highlight circle" button 730, when selected, may allow the subscriber to place a circle, such as circle 715, in image 710. In this example, the subscriber has highlighted the face of the actor in image 710, potentially indicating that this is the "hotspot" or relevant part of the image for purposes of the subscriber's comment. The subscriber may position and place the circle in image 710 using, for example, remote control 245. Another button 740, "add highlight rectangle," may allow the user to position and place a rectangle in image 710.

The subscriber may enter a comment relating to the program in a text box 720. In this example, the subscriber has entered the comment "This guy is a great actor." In some implementations, the subscriber may enter a "type" of comment via a graphical element such as drop-down box 750. Here, the user has chosen "text-general" for the comment type. The comment type may provide information about the comment, such as a general category of the comment. Other comment types may include categories such as: "text-question," which may be used to indicate the subscriber has a question that he would like answered; or "text-fact," which may be used to indicate that the subscriber is entering a particular fact about the frame or scene that may be interesting to other subscribers. The subscriber may indicate he is finished with the comment by selecting "submit" button 760. The comment type selected through drop-down box 750 may eventually be stored in metadata type field 520.

FIG. 7 shows exemplary elements for a graphical interface for receiving subscriber comments. In other embodiments, fewer, different, differently arranged, or additional interface elements than those depicted in FIG. 7 may be used. For example, interface 700 may additionally include a graphical element for entering the extent to which the comment applies.

The subscriber may use this field to enter an indication of whether the comment applies to the whole program or a portion of it.

Referring back to FIG. 6, set-top box 240 may receive the comment entered by the subscriber (block 660). In response, set-top box 240 may transmit the comment to server 220 (block 670). As previously mentioned, server 220 may maintain computer-readable medium 500. The comment received by server 220 may be inserted into computer-readable medium 500. Other subscribers watching the same program, either concurrently with the subscriber or at a later date, may receive and view the submitted comments. Viewing of metadata, such as submitted user comments, will next be described.

Figure 8:
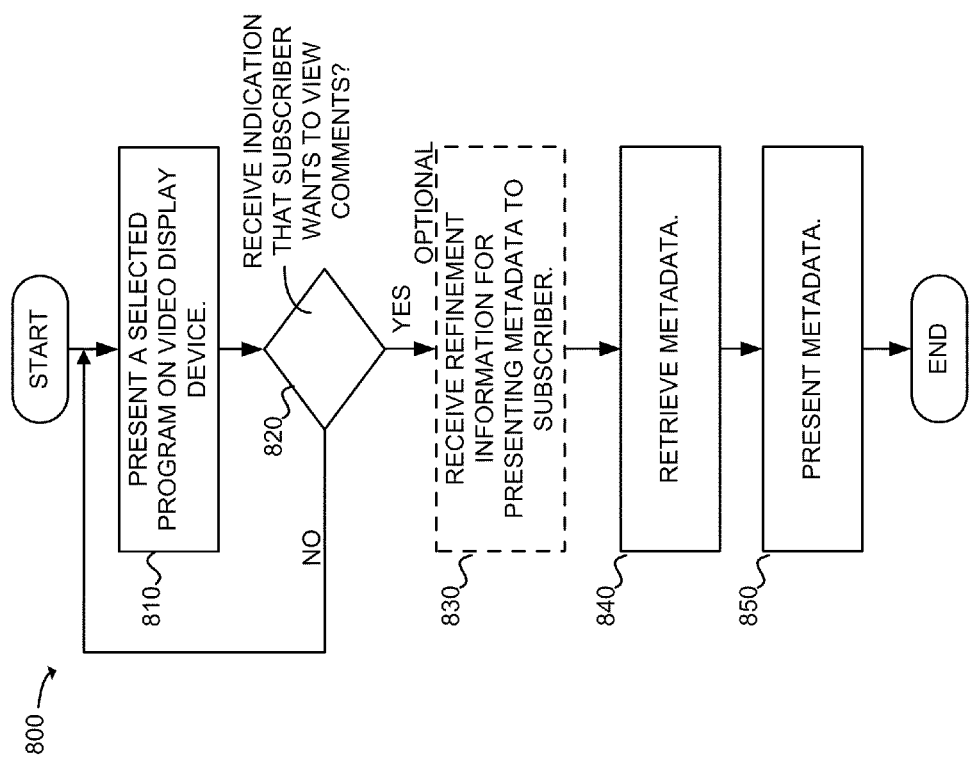
FIG. 8 is a flow chart illustrating exemplary operations for viewing comments about a particular program.

FIG. 8 is a flow chart illustrating exemplary operations 800 for viewing comments about a particular program. Operations 800 may be particularly applicable to a subscriber watching live or recorded (e.g., via a digital video recorder) video who wishes to view comments about the program. Operations 800 may be performed by set-top box 240 and/or server 220.

Set-top box 240 may present a selected program to a subscriber on video display device 250 (block 810). The program may be, for example, a live broadcast or a recorded television program. As previously mentioned, the subscriber may interact with set-top box 240 using a number of possible interface devices, such as a remote control 245, a wireless keyboard, etc.

At some point, the subscriber may wish to view comments about the program currently being viewed. The subscriber may indicate the desire to view comments by, for example, sending a "view comment" command to set-top box 240. The submit comment command may be initiated by the user selecting a particular button or series of buttons (such as by navigating an on-screen guide) on remote control 245. In some implementations, set-top box 240 may include a view comment mode in which comments may be displayed simultaneously with the video program. For example, an icon and/or text may be unobtrusively displayed in a corner of the screen. The icon may change when a comment that is applicable to the current scene is available.

In response to the detection of the view comment command (block 820—YES), set-top box 240 may present an interface to the subscriber through which the subscriber may refine or limit the metadata corresponding to the comments the subscriber desires to view (block 830). In some implementations, the interface through which the subscriber enters refinement information may be an optional interface that may not be presented to the subscriber in some implementations. For example, the subscriber may choose to configure set-top box 240 to always initially display "all comments."

Figure 9:
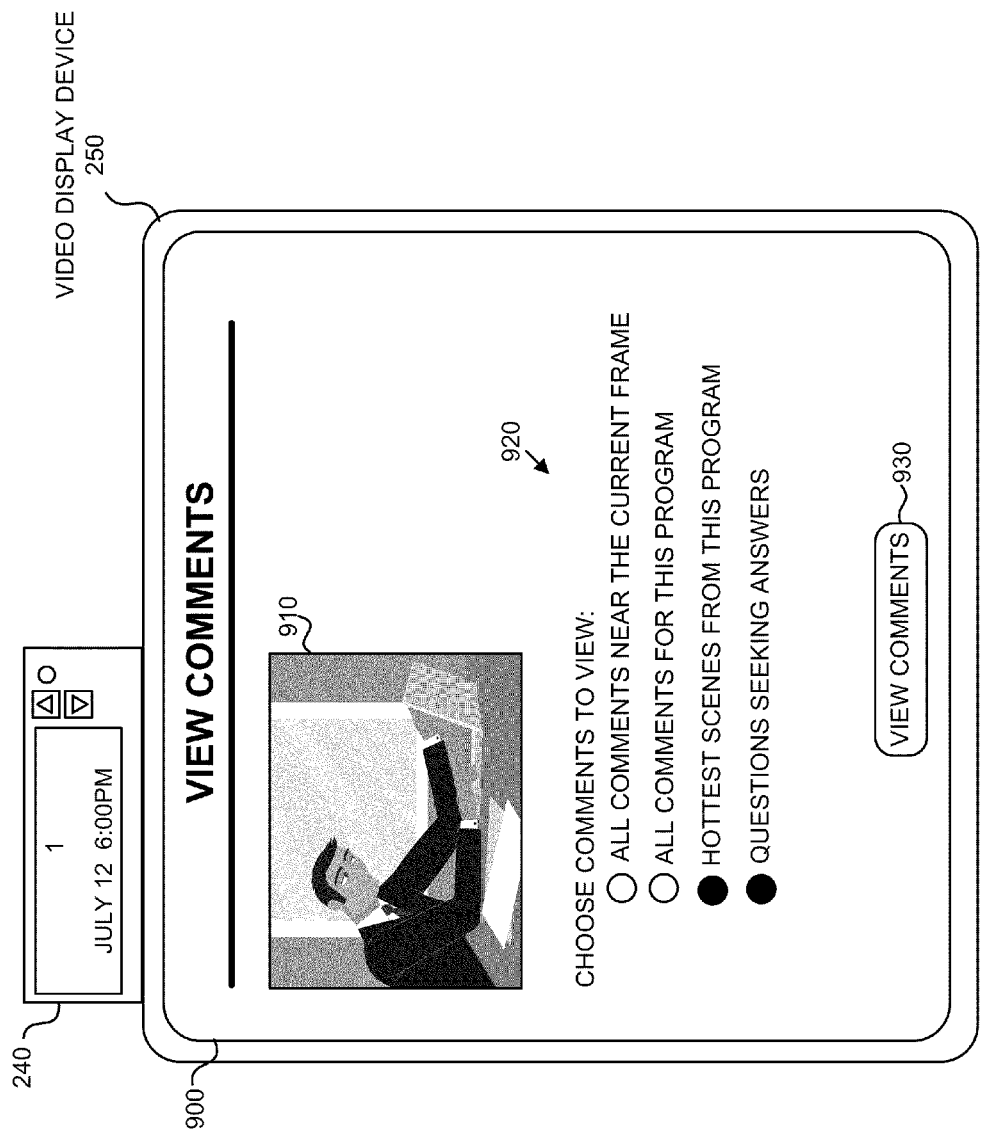
FIG. 9 is a diagram illustrating an exemplary interface through which subscribers may refine a request to view comments about a television program.

FIG. 9 is a diagram illustrating an exemplary interface 900 through which subscribers may refine a request to view metadata about a program. Interface 900 may continue to display a current program 910 in a portion of interface 900. Additionally, interface 900 may present selectable options 920 from which the user may choose. As shown, options 920 may include: all comments near the current frame, all comments for the program, hottest scenes from the program, and questions seeking answers. "Hottest" scenes may refer to scenes that are the subject of the most comments. In this example, the user has selected to view comments from the hottest scenes and comments that include questions seeking answers. The subscriber may select a button 930 to indicate the subscriber would like to proceed to view the comments.

FIG. 9 shows exemplary elements for a graphical interface for determining criteria to use when displaying comments. In other embodiments, fewer, different, differently arranged, or additional interface elements than those depicted in FIG. 9 may be used.

In some implementations, the refinement information, instead of referring to categories of comments, may be used to search for comments that contain specific information. For example, the subscriber may desire to find the title, abstract, a preview, the broadcast schedule, a third-party review, or a frame description of a particular program. In response, set-top box 240 may limit the comments retrieved as comments that may match the subscriber request. For example, for the abstract, preview, or broadcast schedule, only comments authored by the television provider or content creator may be located.

Referring back to FIG. 8, set-top box 240 may next retrieve relevant metadata (block 840). Set-top box 240 may, for example, query server 220 to receive the comments for the program currently being viewed and that match the criteria selected in interface 900. Server 220 may receive the query, retrieve the corresponding results from computer-readable medium 500, and send the results back to set-top box 240. In some implementations, server 220 may continuously transmit newly received metadata, when it is relevant to subscriber's previous query, to set-top box 240 as the metadata is received from other subscribers.

The metadata may then be presented to the user (block 850). For example, set-top box 240 may present the retrieved metadata to the subscriber via video display device 250.

Figure 10:
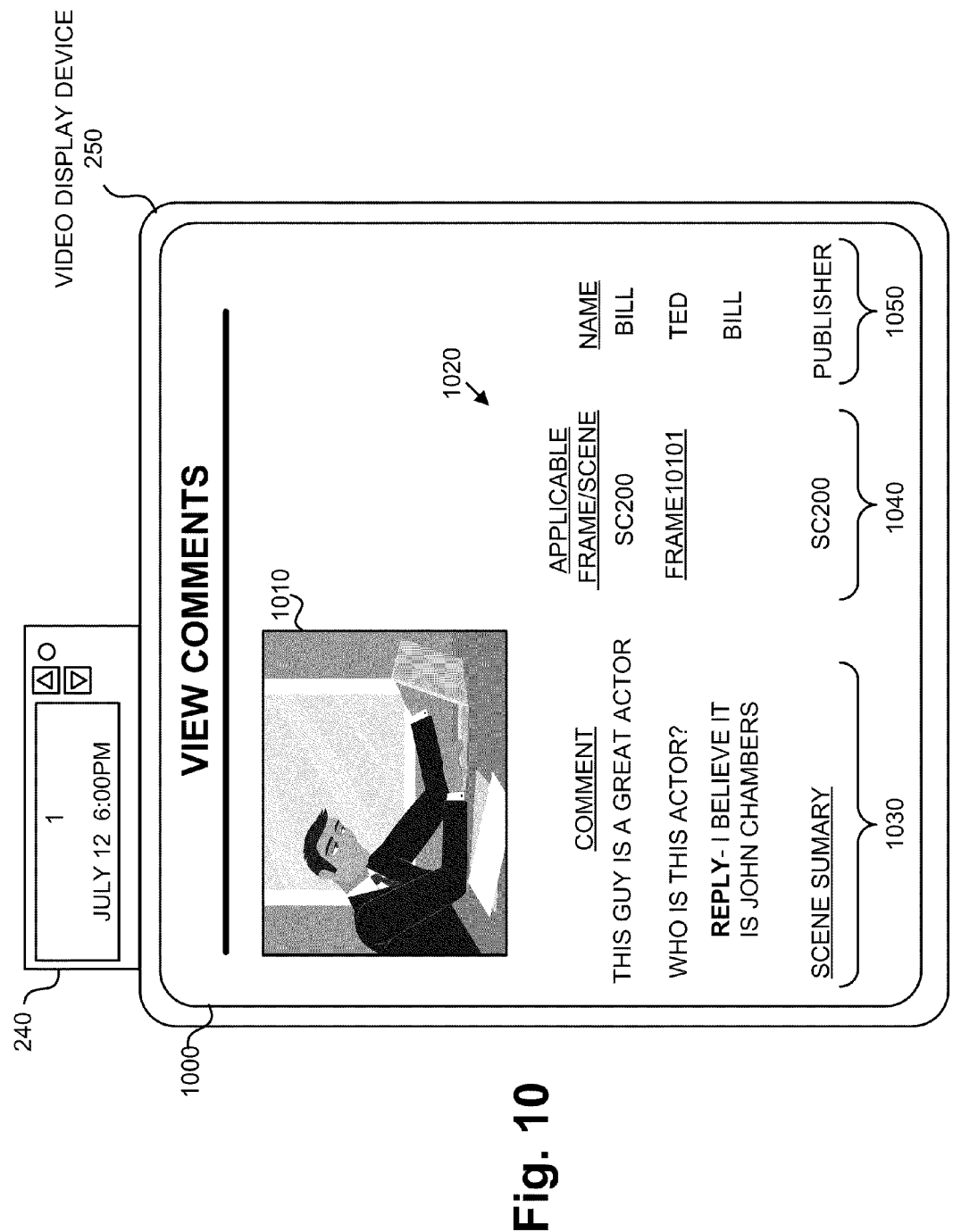
FIGS. 10 and 11 are diagrams illustrating exemplary interfaces that present retrieved comments.

FIG. 10 is a diagram illustrating an exemplary interface 1000 illustrating the presentation of comments corresponding to retrieved metadata. Interface 1000 may continue to display a current program 1010 in a portion of interface 1000. Interface 1000 may additionally include a comment display section 1020. As shown, comment display section 1020 may include comments 1030, an indication of the frame or scene 1040 to which the comment applies, and an account name 1050 of the commentator. Comments 1030 may include the comments being presented to the subscriber. Comments 1030 may be formatted so that comments that include replies to other comments are visually illustrated as being related to the parent comment. In the example of FIG. 10, for instance, the question "Who is this actor?" was asked. A reply to the question ("I believe it is John Chambers") is indented and prefaced with "Reply" to clearly indicate that this comment is a reply to the question. Some comments may include links to indicate that additional information is available. For example, the comment "Scene Summary" may be shown as a link that can be selected by the subscriber. When selected, set-top box 240 may display the full text of this comment. The frame or scene 1040 for the comments may indicate the frame, scene, or other location within the program about which the comment was posted. As with comments, text for frame or scene 1040 may include links that may, when selected, provide additional information. For example, "frame10101", when selected, may cause set-top box 240 to show the particular frame to which the comment refers. If the commentator graphically annotated that frame, such as by drawing a circle, the graphic annotation may be shown. Account name 1050 may identify the author of each comment.

FIG. 10 shows exemplary elements for a graphical interface that presents comments to a subscriber. In other embodiments, fewer, different, differently arranged, or additional interface elements than those depicted in FIG. 10 may be used.

Figure 11:
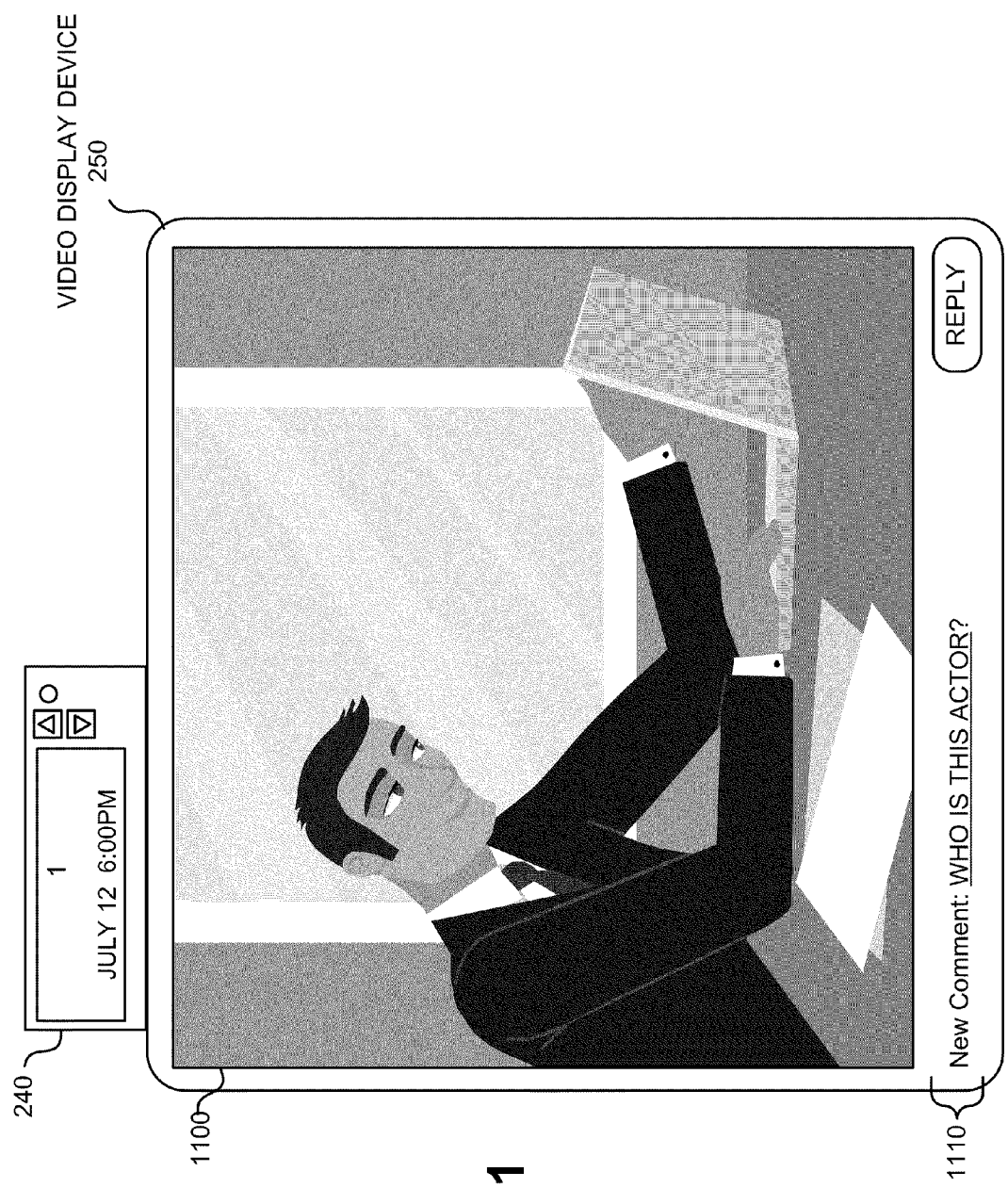

FIG. 11 is a diagram illustrating another exemplary interface 1100 presenting retrieved comments. In contrast to interface 1000, interface 1100 may be designed to allow the user to view the program content in a portion of video display device 250 that includes most of the displayable area. Comments section 1110 may be designed to include an unobtrusive portion of the displayable screen area. As the subscriber is watching the program, comments relevant to the current portion of the program may be continuously scrolled. If the subscriber is interested in a particular comment, the subscriber may, for example, select the comment to view additional information about the comment or select a graphical button to reply to the comment. In the example shown, selecting the comment "Who is this actor?", for instance, may display an image in which the actor is particularly highlighted, such as a graphic highlight (e.g., circle 715) drawn around the actor.

As another example of the use of metadata as described herein, consider the following possible usage scenario. A subscriber watching a baseball game may be impressed by a new player who just hit a homerun. In addition to the information the subscriber gets from the live broadcast, the subscriber would like more details about the new player. The subscriber may press a button on remote control 245 to get screenshot image of the currently displayed frame. The suscriber may highlight the new player with a graphic element (e.g., a circle drawn around the new player) to make this part of the image a hotspot. The subscriber may also submit text asking the name of the new player. The creation of a the new hotspot may be reflected as a new comment that is viewable by other watchers of the game. The comments may be updated at the video display device of other watchers of the baseball game in near real-time. The other watchers (or, in the case of a live broadcast, the live broadcast crew), if interested, may reply to the comment, which may then be received by the subscriber.

A two-way interactive television system was described above. The system may allow content providers and content consumers to easily exchange information, potentially in real-time, about television programs. The system can provide for a richer and more interactive television viewing experience.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flow charts of FIGS. 6 and 8, the order of the blocks may differ in other implementations. Further, non-dependent blocks may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A device comprising:
   a processor to:
      receive a television program;
      provide the television program for presentation on a display device to a viewer;
      receive first information regarding a selection, by the viewer, to view questions and comments associated with a type of scene;
      provide, based on the selection, a query for the questions and for the comments related to the type of scenes;
      receive, from a server, metadata after providing the query,
         the metadata being related to the television program,
         the metadata having been created by one or more other viewers of the television program,
         the metadata including:
            a graphic annotation,
            a question regarding a portion, of a frame of the television program, being highlighted by the graphic annotation,
            information relating to a section of the television program that includes the frame, and
            the comments related to the type of scene;
      provide, for presentation on the display device and based on the metadata, the graphic annotation and the question; and
      provide, for presentation on the display device and based on the metadata, one or more of the comments during one or more other frames of the television program that include the type of scene.

2. The device of claim 1,
   where the graphic annotation includes a circle or a rectangle overlaid on the frame, and
   where the portion is located within an interior of the circle or the rectangle.

3. The device of claim 1, where the processor is further to:
   receive additional metadata relating to the television program from the viewer; and
   transmit, to the server, the additional metadata.

4. The device of claim 1,
   where the metadata includes a plurality of metadata entries, and
   where a particular metadata entry, of the plurality of metadata entries, includes a field that defines a type of the particular metadata entry.

5. The device of claim 1,
   where the television program includes a live broadcast, and
   where the portion includes an image of a person.

6. The device of claim 1, where the processor is further to:
receive, from the viewer, a request to provide a reply to the question;
present, based on the request, an interface for providing the reply to the question; and
receive, via the interface and from the viewer, the reply.

7. A server device comprising:
one or more processors to:
receive metadata created by one or more viewers of a television program,
the metadata relating to the television program, and
the metadata including:
comments related to a type of scene,
a graphic annotation, and
a question regarding a portion, of a frame of the television program, being highlighted by the graphic annotation;
store the metadata;
receive a query for the metadata from a device of another viewer of the television program,
the query being based on the other viewer using the device to select a first option to view questions and a second option associated with the type of scene;
identify the metadata based on the query; and
transmit the metadata to the device of the other viewer for presentation of the graphic annotation and the question during the frame of the television program and for presentation of one or more of the comments during one or more other frames of the television program that include the type of scene.

8. The server device of claim 7,
where the graphic annotation includes a circle or rectangle overlaid on the frame, and
where the portion is located within an interior of the circle or rectangle.

9. The server device of claim 7,
where the metadata includes a plurality of metadata entries, and
where a particular metadata entry, of the plurality of metadata entries, includes a field that defines a type of the metadata entry.

10. The server device of claim 7, where the other viewer or the device of the other viewer is approved, by the one or more viewers, to receive the metadata relating to the television program.

11. A method comprising:
receiving, by a set-top box, a television program;
providing, by the set-top box, the television program to a video display device connected to the set-top box;
receiving, by the set-top box, first information regarding a first selection, by a user of the set-top box, to view questions and to view comments associated with a type of scene;
providing, by the set-top box and based on the selection, a query for the questions and for the comments related to the type of scene;
receiving, from a server and by the set-top box, metadata after providing the query,
the metadata relating to the television program,
the metadata having been created by one or more other users of other set-top boxes, and
the metadata including:
a graphic annotation,
a question regarding a portion, of a frame of the television program, being highlighted by the graphic annotation, and
the comments related to the type of scene;
providing, by the set-top box and for presentation, the graphic annotation and the question via the video display device; and
providing, by the set-top box and for presentation, one or more of the comments during one or more other frames of the television program that include the type of scene.

12. The method of claim 11, further comprising:
providing, by the set-top box, a graphical interface to receive other metadata relating to the television program;
receiving the other metadata via the graphical interface; and
transmitting the other metadata to the server.

13. The method of claim 11,
where the graphic annotation includes a circle or rectangle overlaid on the frame, and
where the portion is located within an interior of the circle or rectangle.

14. The method of claim 11,
where the metadata further includes information relating to structural elements of the television program, and
where the structural elements define the frame or another type of section of the television program.

15. The method of claim 11,
where the metadata includes a plurality of metadata entries, and
where a particular metadata entry, of the plurality of metadata entries, includes a field that defines a type of the particular metadata entry.

16. The method of claim 11,
where the portion includes an image of a person, and
where the question includes a request to identify the person.

17. A non-transitory computer-readable medium storing instructions, the instructions comprising:
one or more instructions that, when executed by at least one processor, cause the at least one processor to:
receive metadata created by a first viewer one or more viewers of a television program,
the metadata relating to the television program, and
the metadata including:
comments related to a type of scene,
a graphic annotation, and
a question regarding a portion, of a frame of the television program, being highlighted by the graphic annotation;
receive a query for the metadata from a device of another viewer of the television program,
the query being based on the other viewer selecting a first option to view questions and a second option associated with the type of scene;
identify the metadata based on the query; and
transmit, based on the query, the metadata to the device of the other viewer for presentation of the graphic annotation and the question during the frame of the television program and for presentation of one or more of the comments during one or more other frames of the television program that include the type of scene.

18. The device of claim 17,
where the graphic annotation includes a circle or rectangle overlaid on the frame, and
where the portion is located within an interior of the circle or rectangle.

19. The non-transitory computer-readable medium of claim 17,
 where the portion includes an image of a person, and
 where the question includes a request for the other viewer to identify the person.

20. The non-transitory computer-readable medium of claim 17, where the other viewer or the device of the other viewer is approved, by the one or more viewers, to receive the metadata relating to the television program.

* * * * *